United States Patent [19]

Urquhart

[11] 4,294,646
[45] Oct. 13, 1981

[54] APPARATUS FOR MANUFACTURING FLAT PLASTIC NET

[75] Inventor: Thomas Urquhart, Cobourg, Canada

[73] Assignee: E. I. Du Pont de Nemours and Company, Wilmington, Del.

[21] Appl. No.: 155,980

[22] Filed: Jun. 3, 1980

Related U.S. Application Data

[62] Division of Ser. No. 26,206, Apr. 2, 1979, Pat. No. 4,242,295.

[30] Foreign Application Priority Data

Oct. 4, 1978 [CA] Canada .................................. 312717

[51] Int. Cl.³ ............................................ B29C 17/14
[52] U.S. Cl. ............................. 156/500; 156/244.15; 156/244.18; 156/350; 156/360; 156/361; 156/363; 156/364; 156/367; 156/510; 264/146; 264/167; 264/DIG. 8; 425/382 N
[58] Field of Search .............. 156/500, 244.15, 244.18, 156/350, 360, 361, 363, 364, 367, 510; 264/146, 167, DIG 81; 425/382 N

[56] References Cited

U.S. PATENT DOCUMENTS

| | | | |
|---|---|---|---|
| 3,089,804 | 5/1963 | Gutievez | 156/500 |
| 3,437,538 | 4/1969 | Ewing | 264/146 |
| 3,551,543 | 12/1970 | Mercer et al. | 264/167 |
| 3,557,268 | 1/1971 | Berretts et al. | 264/167 |
| 3,674,898 | 7/1972 | Larsen | 264/167 |
| 4,057,449 | 11/1977 | Livingstons et al. | 264/167 |
| 4,123,491 | 10/1978 | Larsen | 264/146 |

Primary Examiner—Caleb Weston

[57] ABSTRACT

The invention provides a process and apparatus for manufacturing flat plastic net. Tubular plastic net is made by extruding plastic material through coaxial circular counter-rotating die members to form a net structure having a plurality of crossing strands. The angular displacement of successive longitudinally-aligned junctions of the crossing strands is controlled, preferably by controlling the relative counter-rotation of the extrusion die members, and successive longitudinally aligned junctions are cut longitudinally within each junction. The tubular net so cut is opened out to form flat net.

The flat net so produced, the edges of which are characterized by successive longitudinal edge junctions, in which each edge junction is cut longitudinally within the junction, is particularly useful for fencing material, for example.

5 Claims, 4 Drawing Figures

APPARATUS FOR MANUFACTURING FLAT PLASTIC NET

This is a division of application Ser. No. 026,206, filed Apr. 2, 1979, now U.S. Pat No. 4,242,295.

The present invention relates to a process and apparatus for manufacturing flat plastic net from extruded plastic tubular net.

The term "plastic" used herein refers to synthetic thermoplastic polymers capable of melt extrusion, natural or synthetic rubbers subsequently vulcanized or containing vulcanizing agents, those thermosetting plastic materials or mixtures thereof with thermoplastic materials which are capable of melt extrusion, and foamable compositions comprising any of the above materials.

Extrusion of such plastics, through annular dies counter rotating relatively to one another, to form a tubular net comprising crossing strands of plastic is known. A process for extrusion of such a tubular net is described in Canadian Pat. No. 643 076 which issued June 19, 1962 to F. B. Mercer.

Tubular net is used for a variety of purposes, for example, it is used in the manufacture of hair rollers, or for packaging e.g. Christmas trees, toys, poultry, meats, onions and other comestibles. For some purposes, however, it is desirable that the net be in a flat form, for example for use as a fencing material, or as a guard for preventing leaves etc. from falling into open eavestroughs.

It is possible to produce flat net by a process in which a plastic is extruded through linear dies. However, from the vantage points of economy and flexibility of manufacture, it would be advantageous to be able to produce flat net from tubular net, using a tubular extrusion process, in which tubular net so formed is slit longitudinally. Several disadvantages exist in known methods of manufacturing flat net from tubular net. One such disadvantage is that at least one edge of the flat net tends to be rough i.e. some of the strands, of which the net is composed, protrude at the edge of the net. Apart from being aesthetically objectionable, roughness of the edges is particularly undesirable with net having thick or stiff strands, as for example in fencing material, as the protruding strands may tend to snag on clothing and skin, and therefore is regarded as a safety hazard.

One method of producing net with finished edges is disclosed in U.S. Pat. No. 3,089,804 which issued May 14, 1963 to C. D. Gutierrez, in which two parallel strands of plastic material are extruded simultaneously with and longitudinally onto tubular net, the tubular net subsequently being cut between the parallel strands. This method produced a flat net in which protruding strands at each edge are overlayed with a strand lying close to and parallel to each edge.

It has now been found that flat net having edges substantially devoid of protruding strands may be formed from tubular plastic net, without the need for overlaying edge strands, by controlling the angular displacement of successive longitudinally aligned junctions of crossing strands of the tubular net about the axis of extrusion relative to a fixed plane passing through the axis of extrusion and sometimes hereinafter referred to as the angular displacement of successive net junctions, and subsequently cutting the net longitudinally within the strand junctions.

Accordingly the present invention provides a process for manufacturing flat net from tubular plastic net, comprising the steps of (a) extruding plastic material through coaxial circular counter-rotating die members so as to form, about an axis of extrusion, a tubular net structure comprising a plurality of crossing strands;

(b) controlling the angular displacement of successive substantially longitudinally-aligned junctions of the crossed strands about the axis of extrusion and relative to a fixed plane passing through the axis of extrusion, to minimize said angular displacement;

(c) cutting successive longitudinally-aligned junctions longitudinally and within each junction, along at least one line of successively longitudinally-aligned junctions, such that the tubular net is adapted to be opened into flat net; and (d) advancing the net under tension during the extrusion and cutting steps.

In a preferred embodiment the angular displacement of successive longitudinally-aligned junctions relative to the fixed plane through the axis of extrusion is minimized by controlling the relative counter-rotation of the extrusion die members.

In another embodiment the cut tubular net is opened out to form flat net.

In a further embodiment, the plastic material is a polymer of a 1-olefin, each strand of said 1-olefin polymer having a weight of between 9 and 30 g/m of length. The plastic material most preferred is a polymer of ethylene or propylene.

The present invention also provides an apparatus comprising in combination (a) an extruder adapted to extrude, about an axis of extrusion, plastic net in tubular form through two coaxial circular counter-rotating die members, said plastic net comprising a plurality of crossing plastic strands;

(b) a detector adapted to detect the angular displacement of substantially successive longitudinally-aligned junctions or the crossing strands about the axis of extrusion and relative to a fixed plane through the axis of extrusion;

(c) a controller adapted to regulate the relative rotation of the die members to minimize said angular displacement;

(d) guide means, adapted to align successive longitudinally aligned junctions of the strands of the tubular net with a cutting means, said cutting means being adapted to cut each junction longitudinally and within each junction; and (e) advancing means adapted to move the tubular net from the extruder past said cutting means, and to tension the tubular net during extrusion of the plastic net.

In a preferred embodiment the apparatus includes a means to open the cut tubular net into flat net.

In another embodiment the detecting means comprises a rotatable toothed wheel having each tooth adapted to engage successive longitudinally-aligned apertures in the net, said rotatable wheel being adapted to detect the angular displacement of successive longitudinally-aligned junctions, and the control means comprises a controller to regulate the speed of rotation of one of the die members to minimize the angular displacement of successively longitudinally-aligned junctions, the speed of rotation of the other die member remaining substantially constant.

In yet another embodiment the guide means comprises (a) a rotatable toothed wheel having each tooth adapted to engage with successive longitudinally-aligned apertures in the net, said rotatable wheel being fixedly connected to the cutting means such that the cutting means is aligned with successive longitudinally-aligned junctions and (b) an engaging means adapted to maintain the tubular net in positive engagement with the cutting means at the point of cutting.

The present invention further provides a flat plastic net structure comprising a first plurality of parallel strands crossing and joined to a second plurality of parallel strands at junctions, said first and second pluralities of parallel strands being at an angle to a longitudinal edge of the net, said net structure having two longitudinal edges characterized by successive longitudinal edge junctions, each edge junction being cut longitudinally within said edge junction.

In a preferred embodiment the plastic material is a polymer of a 1-olefin, especially a polymer of ethylene or propylene, and more especially a copolymer of ethylene and 1-butene.

In a further embodiment each strand of the net structure of the polymer of the 1-olefin has a weight of between 11 and 13 g/m of length, and the net structure has a weight of between 360 and 720 g/m².

The invention may be illustrated by reference to the accompanying drawings wherein.

Figure 1:
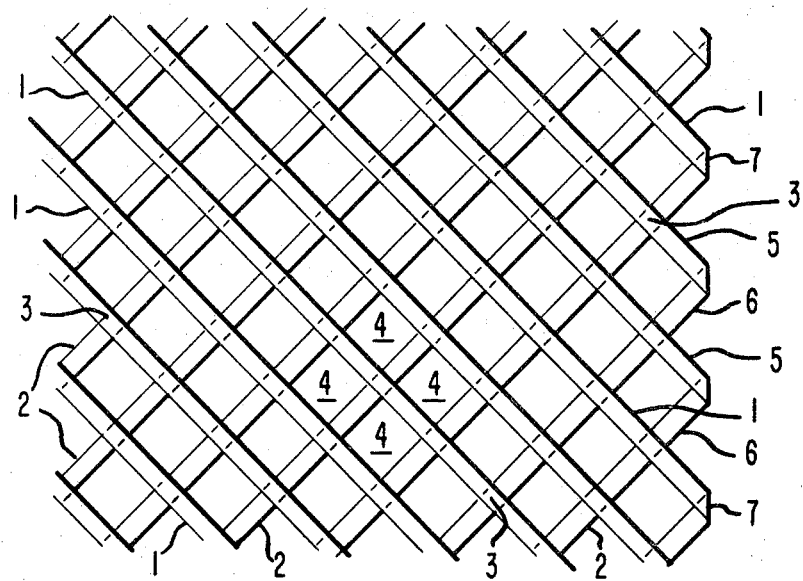
FIG. 1 is a schematic view of a portion of one edge of the flat net produced using the process of the present invention.

Referring to FIG. 1, the flat net produced by the process of the present invention comprises a first plurality of parallel strands 1, crossing a second plurality of parallel strands 2, joined together at each point of crossing at junctions 3. One of the longitudinal edges is defined by edge portions 5 and 6 of strands 1 and 2 respectively terminating at longitudinally-aligned junctions 7 which have been formed by cutting junctions longitudinally within the junction. The pluralities of parallel strands 1 and 2 are angled relative to one another so that the apertures 4 bounded by adjacent strands of both first and second pluralities of parallel strands are generally rhombohedral or square in shape, and are also angled relative to the longitudinal direction of the edge.

Figure 2:
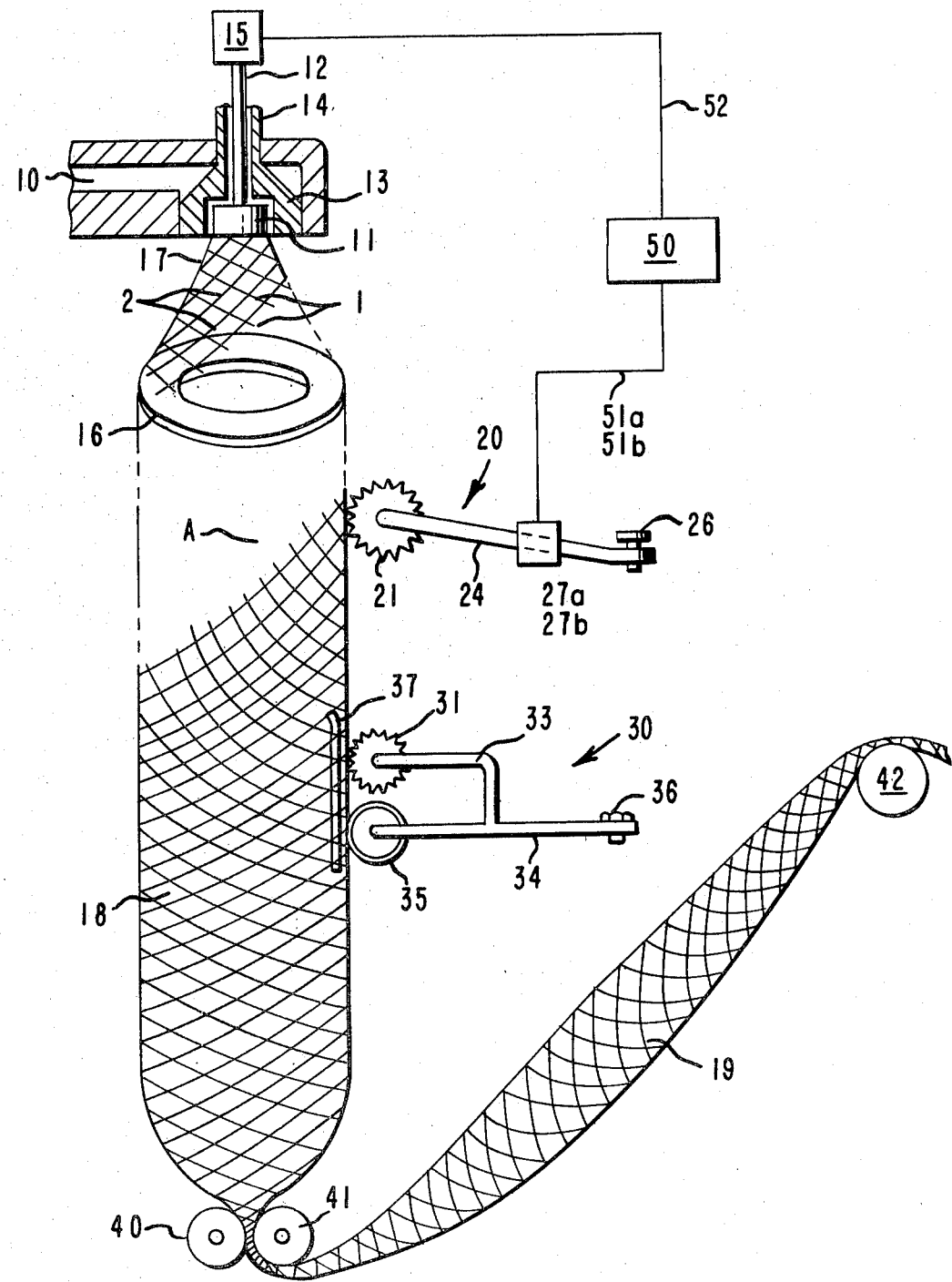
FIG. 2 represents a schematic view partly in cross-section of a preferred embodiment of an apparatus of the present invention arranged to carry out a process of the present invention.

Referring now to FIG. 2, the apparatus comprises (a) an extruder 10 having a hopper (not shown) for introducing plastic material to the extruder, rotatable coaxial die members 11 and 13, inner die member 11 being driven by variable speed motor 15 through drive shaft 12 and outer die member 13 being driven by another motor (not shown) through drive shaft 14;

(b) a circular expansion mandrel 16, the centre of which lies on the same axis as the centre of the coaxial dies, said axis being sometimes herein referred to as the axis of extrusion;

(c) a means 20 for detecting angular displacement about the axis of extrusion (shown by broken line A) from a fixed plane passing through the axis of extrusion;

(d) a means 50 for controlling the angular displacement of longitudinally-aligned strand junctions hereinafter described more fully, by manipulating the power source (not shown) of motor 15;

(e) a means 30 for guiding and cutting longitudinally aligned junctions of crossing strands;

(f) nip rolls 40 and 41, at least one of which is driven by a motor (not shown); and (g) bar 42 over which flat net is guided before being wound up on a spool or mandrel (not shown). Provision may also be made to cut flat net transversely, for example, by a guillotine.

As will be described more fully hereinafter, tubular net indicated by 17 and 18 is extruded through die lips 11 and 13, tubular net 17 being in an expandable state and tubular net 18 being fully expanded.

Figure 3:
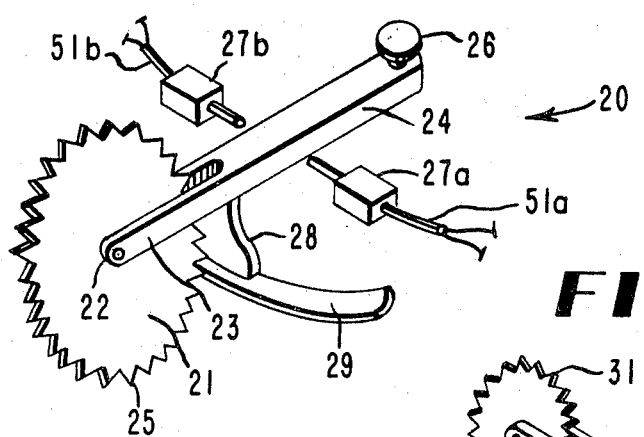
FIG. 3 is a schematic representation of a preferred control means of the apparatus of the present invention.

Referring now to FIG. 3, the means 20 shown in FIG. 2, for detecting the angular displacement of successive net junctions of the net 18, comprises a rotatable toothed wheel 21 journalled on axle 22 in forks 23 of pivot rod 24. The plane through the teeth 25 of the toothed wheel is parallel to the extrusion axis, A (see FIG. 2).

Again referring to FIG. 3, the teeth 25 may be pointed so that the leading and trailing edges of each tooth may engage with longitudinally-aligned and opposing corners of an aperture, or may be shaped at the point to be substantially the male counterpart of the shape of the aperture.

Pivot rod 24 is pivotted at the end furthest away from the toothed wheel, by bolt 26 which is inserted and held in an immovable frame (not shown) such that toothed wheel 21 may move in a direction substantially perpendicular to the plane through the teeth of the toothed wheel. On either side of pivot rod 24 are means 27a and 27b for detecting the movement of pivot rod 24 about its pivot point at bolt 26. Each detecting means 27a and 27b may be an on/off device, for example a microswitch or may be combined into a continuous device for detecting position, for example a mechanical pointer connected to a linear potentiometer. The type of detector chosen will be governed by the accuracy of control required which in turn will depend in part upon the width of the junctions. By the width of a net junction is meant the distance across the net junction in the direction of the circumference of the tubular net. Detecting means 27a and 27b are capable of sending a suitable signal e.g. an electric or pneumatic signal to controller 50 through signal transmission lines 51a, and 51b respectively. Controller 50 has a set point and means for comparing signals from transmission lines 51a and 51b with the set point, and a transmission means 52 for transmitting a control signal to motor 15. Pivot rod 24 may be supported by slide 28 attached to the pivot rod and may travel on track 29. Track 29 is arcuate, centred about bolt 26 and is attached to an immovable frame (not shown). As may be apparent to those skilled in the art slide 28 and track 29 may be replaced by equivalent means for supporting the pivot rod while allowing the pivot rod to move freely about its pivot, at bolt 26.

Figure 4:
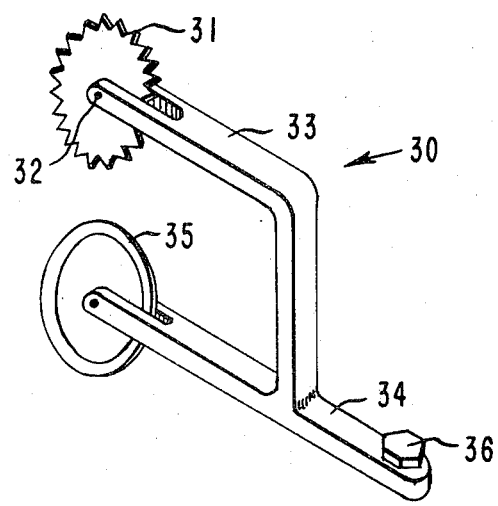
FIG. 4 is a schematic view of a portion of a preferred guiding and cutting means fixedly connected one to the other.

Referring now to FIGS. 2 and 4 the guiding and cutting means 30 comprises a rotatable toothed wheel 31 mounted on an axle 32 journalled in a forked connecting bar 33. Connecting bar 33 is fixedly connected to cutter pivot rod 34 at one end of which is journalled to cutter disc 35, the other end of which is pivotably connected by bolt 36 to an immovable frame (not shown). The plane through the teeth of toothed wheel 31 also passes through the plane through the cutting edge of cutter disc 35 and is parallel to the axis of extrusion A. Toothed wheel 31 may be situated after or preferably before cutter disc 35. Toothed wheel 31 is freely rotatable while cutter disc 35 is driven by a motor (not shown). Guide shoe 37 comprises two parallel bars or plates which straddle the teeth of toothed wheel and the cutting edge of the cutter disc, the end of the bars nearest the extruder being bent generally towards the axis of extrusion to form a throat into which part of the tubular net may enter. Guide shoe 37 is adapted to guide the net and hold it in cooperative engagement with toothed wheel 31 and cutter disc 35.

As was hereinbefore mentioned at least one of nip rolls 40 and 41 is driven, by a motor (not shown), each nip roll being suitably journalled in bearings. Bar 42 may be fixed, or rotatable, and should be at least as long as the circumference of the expanded net i.e. the width of the flat net.

A preferred operation of the apparatus described above is described hereinafter, reference being made to the drawings.

Pellets of plastic material are gravity fed from the hopper into the extruder 10 which is heated. The plastic material, when molten, is extruded between the counter-rotating coaxial die members 11 and 13. The molten plastic exits from the counter-rotating dies in two pluralities of parallel strands 1 and 2, the two pluralities of strands being at an angle to one another. One of the pluralties of parallel strands is overlayed on the other plurality of parallel strands to form a net having a plurality of crossing junctions 3. As the dies are coaxial, tubular net is continuously being formed. Upon emergence of the plastic from between the die members, the plastic is still molten and remains in a molten or semi-molten state while overlaying of the strands occur so that crossing strands fuse at their junctions. The plastic tubular net so formed is normally expanded while in the formative state over the expansion mandrel 16 and simultaneously cooled to its solid state by cascading water over and around the expanding net 17.

It is important for the process of the present invention that successive longitudinally aligned junctions remain essentially parallel to the axis of extrusion, otherwise a bias is introduced which if allowed to develop unchecked would make the cutting step of the process difficult and the net so formed by the process difficult to use in some applications e.g. fencing. The purpose of detecting means 20 and controller 50 is to essentially eliminate development of the bias hereinabove described.

The expanded net 18, after passing over expansion mandrel 16 is pulled downwards by the pair of nip rolls 40 and 41. The rate of rotation of the driven nip rolls is manually adjustable and is set at a speed to ensure that the net structure has the desired configuration i.e. shape of the apertures e.g. square or rhombohedral. Prior to being pulled through the nip rolls, a part of the tubular net comes in contact with detecting means 20 and guiding and cutting means 30. As the tubular net passes by detecting means 20, successive teeth 25 of toothed wheel 21 cooperatively engage with successively longitudinally aligned apertures in the tubular net. In the event that the angular displacement of successive junctions of the tubular net deviates from a fixed plane through the axis of extrusion, the toothed wheel 21 will be caused to deviate about pivot bolt 26. The deviation of toothed wheel 21 about pivot bolt 26 is detected by contact of pivot rod 24 with one of the detecting means 27a or 27b. Contact of the pivot rod 24 with one of the detecting means, for example 27a, causes a signal to be sent to controller 50 via transmission line 51a. The signal, which is indicative of the position of the pivot rod and therefore the angular displacement of successive net junctions, is compared to a set point, which is equivalent to no angular displacement. On the basis of such comparison a signal is sent via transmission line 52 to motor 15 to speed up or slow down motor 15, as is dictated by the direction of movement of pivot rod 24. Through use of such detection and control means it is possible to control the angular displacement of successive net junctions closely, thereby substantially eliminating the aforementioned bias.

Subsequent to passing detecting means 20, the tubular net is pulled by nip rolls 40 and 41 past guiding and cutting means 30. Successive teeth of toothed wheel 31 cooperatively engage with successive longitudinally aligned apertures in the tubular net 18. The tubular net is pressed against toothed wheel 31 by guide shoe 37. The successive longitudinally aligned junctions of tubular net 18 are thus firmly guided as they travel past the toothed wheel and are also aligned with the cutting edge of cutter disc 35 as a result of the relative fixed alignment of the cutter disc 35 with toothed wheel 31. Cutter disc 35, which is rotated by a motor (not shown), cuts diagonally across the aligned junctions 3 of the tubular net 18 to produce cut junctions 7 as shown in FIG. 1.

After being cut by cutting disc 35 the net is pulled through nip rolls 40 and 41 as hereinbefore described. After passing through the nip rolls the cut net is opened out into a substantially flat net 19 and pulled by means (not shown) over guide bar 42. Generally it is desirable then to wind the flat net into rolls either manually or more conveniently on a driven mandrel. Provision is made to cut the flat net transversely, so that rolls of the net are of convenient lengths of net and/or of convenient weight for further handling.

The following example is intended to illustrate an embodiment of the invention without limiting the claims.

EXAMPLE

The apparatus was substantially as hereinbefore described and conformed to dimensions and construction as hereinbelow described.

An extruder, available from National-Eyre and equipped with counter-rotating dies of the kind described in Canadian Pat. No. 871 206 to McHardy and Urquhart dated May 18, 1971 was used. Expansion mandrel 16 was an aluminum ring 38 cm in outside diameter, supported by a shaft from the inner die lip 8.75 cm from the lower face of the die members.

Detecting means 20 was about 37.5 cm below the die members. The teeth 26 of toothed wheel 21 were triangular in shape and lying in the same plane as the body of the toothed wheel. The diameter measured across the circumference joining the points of the teeth was 15 cm and the diameter measured across the circumference joining the notches between the teeth was 10 cm.

The length of pivot rod 24 between axle 22 and the pivot bolt 26 was 35 cm. Two microswitches 27a and 27b were placed 10 cm from pivot bolt 26 and so placed as to detect deviations of pivot rod 24 of 12.5 mm thus allowing the toothed wheel to hunt over a distance of 12.5 mm transversely to the axis of extrusion. The outputs of the microswitches were connected to a commercially available controller (50). The output of the controller was used to manipulate the output of a speed control controller for motor 15 which controlled the angular speed of the inner die member 11.

Toothed wheel 21 was so positioned that the plastic net 18 when passing the toothed wheel was cooperatively engaged with teeth 25 i.e. bolt 26 was about 17.5 cm from the axis of extrusion.

Guiding and cutting means 30 was approximately 1.2 m below the die lips. Guide toothed wheel 31 was of the same dimensions as toothed wheel 21, the axis of rotation being 30 cm above the axis of rotation of cutting disc 35. Cutting disc 35 was 15 cm in diameter, 2 mm thick, and driven by a 0.125 hp air motor. The distance between axle 32 and bolt 35 was 30 cm. The cutting disc and toothed wheel 31 were fixedly connected by forked connecting bar 33 and cutter pivot rod 34, substantially as shown in FIG. 4.

Guide shoe 37 consisted of two bars, each 25 cm long and 12.5 mm in diameter, having the first 7.5 cm of the end nearest the extruder bent towards the extrusion axis at an angle of about 20°. The bars, which were attached to the supports for a cutting disc guard assembly (not shown), were 8 cm from the rotational axis of toothed wheel 31 and cutter 35.

Nip roll 40 was 16.25 cm in diameter and 120 cm in length and free to rotate about its longitudinal axis. Nip roll 41 was of similar dimensions and driven by a 1 hp motor. The nip rolls were positioned approximately 2 m below the die lips.

Bar 42 was circular in cross section having a diameter of 15 cm and positioned 2.7 m above the die lips, 3 m laterally from the die lips and parallel to nip rolls 40 and 41.

A guillotine was provided to cut the flat net into suitable lengths and a coreless mandrel was used to wind flat net into coils.

98 Parts of polyethylene pellets available under the trademark SCLAIR from Du Pont of Canada Limited were fed into the extruder hopper for every part of green colour concentrate pellets, available from Dunlop of Canada Limited. The blend of pellets was melt-extruded by the extruder through the die lip members.

The motors controlling the angular speeds of the die lips were set so that the outer die member rotated at about 5 rpm and the inner member counter-rotated at about 5.02 rpm relative to the outer die member. The expanding net was pulled over the expansion mandrel and cooled with water at a temperature of about 5° C. The extrusion rate, the die member rotational speed and the nip roll speeds were adjusted so that the plastic net had substantially square apertures of about 30 mm between parallel strands and had a weight of 220 g/m length of tube. The tubular net was formed at a rate of about 3 meters per minute.

The cutter disc 35 was rotated at an angular speed of about 1800 rpm.

The flat net so formed had a bias of no more than 0.2 cm over a length of 15 m and about 97% of the cut junctions were cut completely within the junction.

The embodiments of the invention in which an exclusive property or privilege is claimed are defined as follows:

1. An apparatus comprising in combination
   (a) an extruder adapted to extrude, about an axis of extrusion, plastic net in tubular form through two coaxial circular counter-rotating die members, said plastic net comprising a plurality of crossing plastic strands;
   (b) a detector adapted to detect the angular displacement of substantially successive longitudinally-aligned junctions of the crossing strands about the axis of extrusion and relative to a fixed plane through the axis of extrusion;
   (c) a controller adapted to regulate the relative rotation of the die members to minimize said angular displacement;
   (d) guide means, adapted to align successive longitudinally aligned junctions of the strands of the tubular net with a cutting means, said cutting means being adapted to cut each junction longitudinally and within each junction; and
   (e) advancing means adapted to move the tubular net from the extruder past said cutting means, and to tension the tubular net during extrusion of the plastic net.

2. An apparatus according to claim 1 wherein the detecting means comprises a rotatable toothed wheel having each tooth adapted to engage successive longitudinally-aligned apertures in the net, said rotatable wheel being adapted to detect the angular displacement of successive longitudinally-aligned junctions, and the control means comprises a controller to regulate the speed of rotation of one of the die members to minimize the angular displacement of successively longitudinally-aligned junctions, the speed of rotation of the other die member remaining substantially constant.

3. An apparatus according to claim 2 wherein the guide means comprises
   (a) a rotatable toothed wheel having each tooth adapted to engage with successive longitudinally-aligned apertures in the net, said rotatable wheel being fixedly connected to the cutting means such that the cutting means is aligned with successive longitudinally-aligned junctions and
   (b) an engaging means adapted to maintain the tubular net in positive engagement with the cutting means at the point of cutting.

4. An apparatus according to claim 1 wherein the guide means comprises
   (a) a rotatable toothed wheel having each tooth adapted to engage with successive longitudinally-aligned apertures in the net, said rotatable wheel being fixedly connected to the cutting means such that the cutting means is aligned with successive longitudinally-aligned junctions and
   (b) an engaging means adapted to maintain the tubular net in positive engagement with the cutting means at the point of cutting.

5. An apparatus according to claim 1, 4, or 3 additionally having a means to open the cut tubular net into flat net.

* * * * *

UNITED STATES PATENT OFFICE
CERTIFICATE OF CORRECTION

PATENT NO. : 4,294,646
DATED : October 13, 1981
INVENTOR(S) : Thomas Urquhart

It is certified that error appears in the above-identified patent and that said Letters Patent are hereby corrected as shown below:

On the title page, Item [73]

Assignee reading "E. I. du Pont de Nemours and Company, Wilmington, Del." should read --Du Pont Canada Inc., Montreal, Canada--.

Signed and Sealed this

Sixth Day of April 1982

[SEAL]

Attest:

GERALD J. MOSSINGHOFF

Attesting Officer

Commissioner of Patents and Trademarks